United States Patent
Whitney et al.

(10) Patent No.: US 9,122,552 B2
(45) Date of Patent: Sep. 1, 2015

(54) HYBRID CLOUD INFRASTRUCTURES

(75) Inventors: Jonathan Newcomb Swirsky Whitney, Oakland, CA (US); Alexander Vul, Palo Alto, CA (US); Matthew D. Connors, Half Moon Bay, CA (US); Johan Eriksson, Orebro (SE); Atanu Neogi, Brookline, MA (US)

(73) Assignee: BMC Software, Inc., Houston, TX (US)

( * ) Notice: Subject to any disclaimer, the term of this patent is extended or adjusted under 35 U.S.C. 154(b) by 133 days.

(21) Appl. No.: 13/538,591

(22) Filed: Jun. 29, 2012

(65) Prior Publication Data
US 2014/0007079 A1    Jan. 2, 2014

(51) Int. Cl.
*G06F 9/445*    (2006.01)

(52) U.S. Cl.
CPC ........................................ *G06F 8/61* (2013.01)

(58) Field of Classification Search
CPC ............... G06F 8/71; G06F 8/20; G06F 8/36; G06F 9/44505; G06F 8/61; G06F 8/63; G06F 8/60; G06F 8/65; G06Q 10/10
See application file for complete search history.

(56) References Cited

U.S. PATENT DOCUMENTS 8,069,204 B2 * 11/2011 Reisman ....................... 709/203
2013/0311986 A1 * 11/2013 Arrouye et al. ............... 717/175

OTHER PUBLICATIONS

"CloudSwitch Enterprise, Product Overview", (2010), 2 pages.

* cited by examiner

*Primary Examiner* — Chuck Kendall
(74) *Attorney, Agent, or Firm* — Brake Hughes Bellermann LLP (57) ABSTRACT

Methods and apparatus for implementing hybrid-cloud computing networks are disclosed. An example computer-implemented method includes receiving, at a computing device, a request to provision a user application. The method further includes identifying an application blueprint corresponding with the request and identifying at least one computing resource corresponding with the request. The method still further includes identifying a network blueprint that includes the at least one computing resource, provisioning a computing network in accordance with the identified network blueprint and provisioning the at least one computing resource in the provisioned computing network. The method also includes, installing the user application in the provisioned at least one computing resource in accordance with the application blueprint.

24 Claims, 5 Drawing Sheets

HYBRID CLOUD INFRASTRUCTURES

TECHNICAL FIELD

The subject matter of the present disclosure relates, generally, to techniques for providing cloud-based computing infrastructures.

BACKGROUND

The growth in network-based computing, which is also often referred to as "cloud computing", has provided alternatives for designing and implementing computing resources, as compared with traditional approaches where a user (or entity) purchases hardware and software and then manages that hardware and software on an ongoing basis. For instance, many Information Technology (IT) organizations wish to transform their computing resources infrastructure and operations into a network (cloud) based infrastructure, whether as virtual computing resources in a public cloud, virtual computing resources in a private cloud, physical (on-premise) computing resources, or as a combination of these different types of computing resources in a hybrid-cloud infrastructure.

Such approaches may allow for IT organizations, when providing computing services to their clients, to take advantage of existing public cloud services, as well have access to new public cloud services as they become available. However, managing such hybrid clouds, in order to offer meaningful services to an IT organization's (e.g., internal or external) customers, without exposing the complexities of the hybrid environment is a challenge. For example, a group of customers of a given IT organization may wish to make use of a specific set of computing resources, such as servers that are running on a specific operating system (OS). The customers of that group may not care whether those servers are running on physical computing resources, running as on-premise virtual machines (VMs), running as Amazon EC2 instances, running as vApps in a vCloud such as a Terremark Enterprise Cloud, or as a combination of such resources. The customers of that group may care, however, that the IT organization provides them with those servers in specific network configurations, so the customers are able to install and run user applications that operate in those specific network configurations.

One of the motivations for an IT organization to implement computing resources in cloud-based infrastructures is that such approaches allow for "workload flexing", which may include a number of different techniques including "workload movement" and "cloud-bursting." As used in this disclosure, workload flexing generally involves dynamically modify the computing resource(s) (e.g., memory, processing bandwidth, a number of servers, etc.) that are assigned to a given "workload." A workload may be associated with a single application, or it may be associated with several applications that may be operating collaboratively. As indicated above, this dynamic modification of computing resources can take a number of forms, including workload movement and cloud bursting. Workload movement may involve moving a given workload from one set of resources to another, as a whole. In comparison, cloud bursting may involve expanding set of computing resources for a given workload (e.g., with public or private cloud resources) for a temporary amount of time, e.g., to accommodate a transient increase in the given workload. In such approaches, an original set of computing resources (e.g., on-premise resources) assigned to the given workload remain active and the temporary (e.g., cloud) computing resources are added and removed, as needed.

Currently, if an IT organization implements the servers from the above example in a hybrid-cloud infrastructure with user applications required by its customer (e.g., using a combination of on-premise resources, private cloud resources and public cloud resources) and wishes to provide the ability to allow for flexing, work movement and cloud-bursting, the IT organization must make implementation choices that either limit flexibility or adversely impact performance. These choices include, for example, standardizing all of an organization's cloud-based resources on a single technology. This approach, however, prevents users from accessing features and/or services that are available on other cloud-based technologies.

Another implementation choice that can be made is to separate (silo) the use of cloud services and on-premise services such that a given user application runs in only one environment. This approach, however, exposes the complexity of the hybrid network to the IT organization's customers, making it the customers' responsibility to make decisions as how to implement a hybrid-cloud infrastructure, as well as effectively making it the customers' responsibility to manage that hybrid environment, rather than providing customers with a unified (e.g., seamless) view of an organizations' available computing resources.

Another implementation choice is to add a level of virtualization to cloud-based virtual resources as well as adding a virtualization layer to on-premise physical resources, such as by using multiple levels of hypervisors (virtual machine managers), where a top level hypervisor is used to standardize communication between respective hypervisors that manage VMs on different cloud based technologies and/or standardize communication between cloud-based resources and on-premise, physical resources. This approach, however, severely impacts application performance due to the use of the additional layer of virtualization.

SUMMARY

In one general aspect, a computer-implemented method includes executing, by at least one processor of a computing device, instructions recorded on a non-transitory computer-readable storage medium, where the method includes receiving, at the computing device, a request to provision a user application. The method also includes identifying an application blueprint corresponding with the request and identifying at least one computing resource corresponding with the request. The method further includes identifying a network blueprint that includes the at least one computing resource, provisioning a computing network in accordance with the identified network blueprint and provisioning the at least one computing resource in the provisioned computing network. The method still further includes installing the user application in the provisioned at least one computing resource in accordance with the application blueprint.

Implementations may include one or more of the following features. For example, identifying the at least one computing resource and identifying the network blueprint may be performed iteratively based on a library of computing resource images. Iteratively identifying the at least one computing resource and the network blueprint may be based on a library of application installation packages. The library of computing resource images and the library of application installation packages may be included in a unified installation package library.

Identifying the network blueprint may include identifying a hybrid network blueprint. The hybrid network blueprint may define a hybrid computing network and may include two or more of an on-premise computing resource, a private-cloud computing resource and a public-cloud computing resource. The hybrid computing network may include a secure data communication tunnel operably coupling two computing resources of the hybrid computing network.

The request to provision the user application may include at least one of computing resource criteria and network topology criteria. The computing resource criteria may include one or more of an indication of an operating system, an indication of a computing resource platform type and an indication of a computing resource location. The network topology criteria may include one or more of an indication of a number of application tiers, an indication of a private-cloud computing resource, an indication of a public-cloud computing resource and an indication of an on-premise computing resource.

The application blueprint may include a respective definition of the at least one computing resource, the definition including one or more of an indication of an operating system, an indication of a computing resource platform type and an indication of a computing resource location. The application blueprint may include network topology criteria including one or more of an indication of a number of application tiers, an indication of a private-cloud computing resource, an indication of a public-cloud computing resource and an indication of an on-premise computing resource.

The network blueprint may include network topology criteria that may include one or more of an indication of a private-cloud computing resource, an indication of a public-cloud computing resource and an indication of an on-premise computing resource.

Identifying at the least one computing resource corresponding with the request may include identifying two or more computing resources corresponding with the request.

In another general aspect, a computer program product tangibly embodied on a non-transitory computer-readable storage medium includes instructions that, when executed, cause a processor to perform a process, the instructions including instructions to receive a request to provision a user application. The instructions also include instructions to identify an application blueprint corresponding with the request, identify at least one computing resource corresponding with the request and identify a network blueprint that includes the at least one computing resource. The instructions further include instructions to provision a computing network in accordance with the identified network blueprint and provision the at least one computing resource in the computing resource network. The instructions still further include instructions to install the user application in the provisioned at least one computing resource in accordance with the application blueprint.

Implementations may include one or more of the following features. For example, the instructions to identify the at least one computing resource and to identify the network blueprint may include instructions to iteratively identify the at least one computing resource and the network blueprint based on an installation package library. The installation package library may include at least one machine installation package corresponding with the at least one computing resource and at least one application installation package corresponding with the user application.

The instructions to provision the computing network may include instructions to provision a hybrid computing network including two or more of a private-cloud computing resource, a public-cloud computing resource and an on-premise computing resource. The instructions to identify the at least one computing resource corresponding with the request may include instructions to identify two or more computing resources corresponding with the request.

In another general aspect, a computing device includes instructions recorded on a computer-readable medium and executable by at least one processor, the instructions, when executed by the at least one processor, cause the computing device to implement an installation package library. The installation package library includes a first installation package configured to provision a first computing resource having a first machine image, a second installation package configured to provision a second computing resource having a second machine image and a third installation package configured to install a user application on the first computing resource and the second computing resource. The instructions, when executed by the at least one processor, further cause the computing device to implement an application blueprint library including an application blueprint corresponding with the user application. The application blueprint includes application metadata defining configuration information for the user application. The instructions, when executed by the at least processor, still further cause the computing device to implement a network blueprint library including a network blueprint. The network blueprint includes network metadata defining a computing network including the first computing resource and the second computing resource. The instructions, when executed by the at least one processor, also cause the computing device to implement a provisioner. The provisioner is configured to receive a request to provision the user application; identify, in response to the request, the application blueprint; identify, in response to the request, the network blueprint; provision the computing network in accordance with the network metadata; provision the first computing resource in accordance with the first installation package; provision the second computing resource in accordance with the second installation package; and install the user application in accordance with the third installation package and the application blueprint.

Implementations may include one or more of the following features. For example, the instructions, when executed by the at least one processor, may cause the computing device to implement an installation package library administrator. The installation package library administrator may be configured to receive the first, second and third installation packages, store the first, second and third installation packages in the installation package library and catalog the first second and third installation packages in the installation package library.

The instructions, when executed by the at least one processor, may cause the computing device to implement a blueprint library administrator configured to receive the application blueprint and the network blueprint, store the application blueprint in the application blueprint library, catalog the application blueprint in the application blueprint library, store the network blueprint in the network blueprint library and catalog the network blueprint in the network blueprint library.

At least one of the first, second and third installation packages may include a respective plurality of installation packages. At least one of the first and second computing resources may include a virtual computing resource.

The details of one or more implementations are set forth in the accompanying drawings and the description below. Other features will be apparent from the description and drawings, and from the claims.

DETAILED DESCRIPTION

Figure 1:
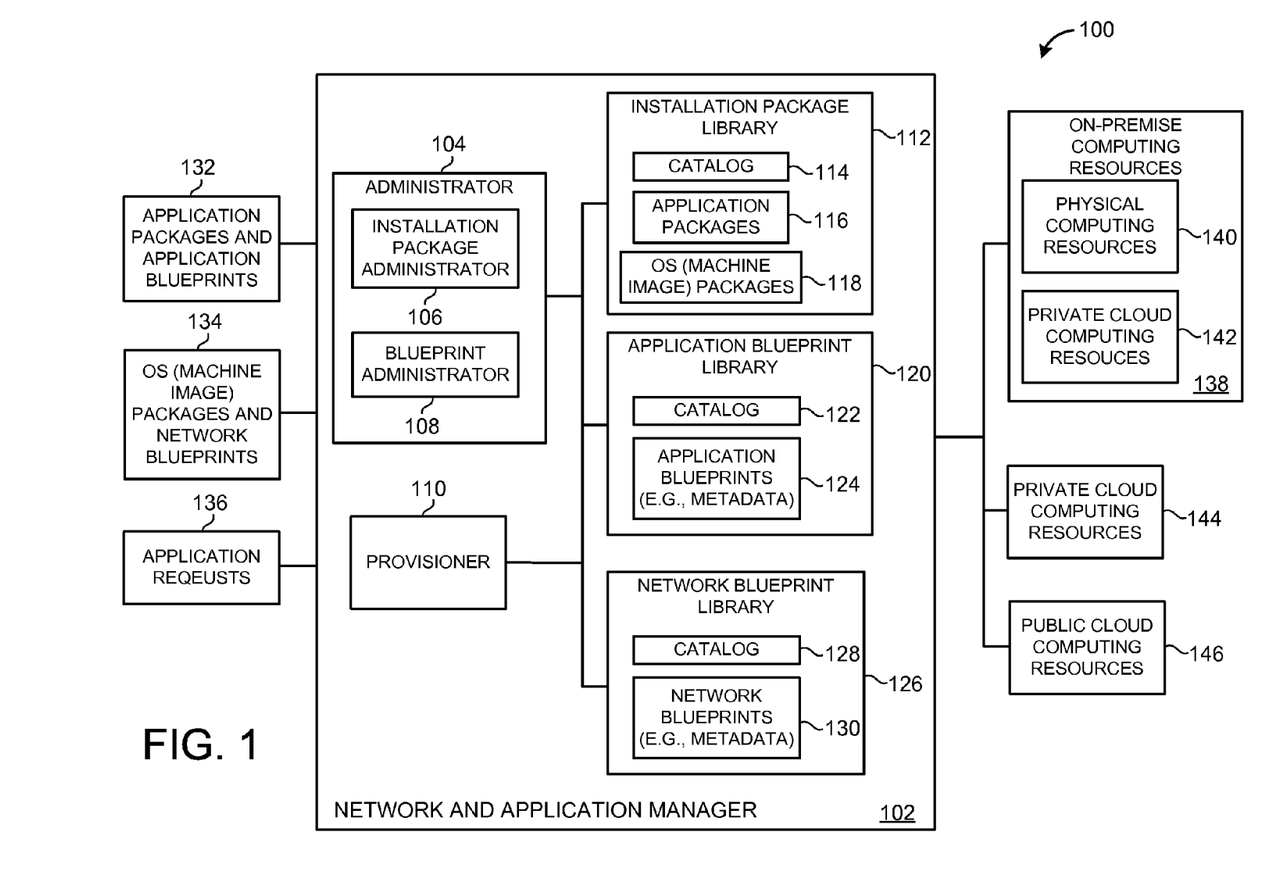
FIG. 1 is a block diagram illustrating a computing network according to an example implementation.

FIG. 1 is a block diagram illustrating a system 100 for providing (implementing) hybrid-network infrastructures according to an example implementation. The system 100 may be used to implement hybrid-cloud infrastructures (e.g., using the techniques described herein) that avoid the drawbacks of current approaches discussed above. For instance, the system 100 may be used to implement hybrid-cloud infrastructures that allow for flexing, work movement and cloud-bursting, while also allowing an IT organization to provide its customers access to features and services on different cloud-based platforms without exposing the complexity of the hybrid-cloud infrastructure to the customers, and without adding additional layers of virtualization.

As described herein, these advantages may be achieved by separating installation packages for implementing hybrid-cloud computing resources into discrete machine installation packages and application installation packages, as well as by provisioning hybrid-cloud infrastructures using libraries of application blueprints and network blueprints in conjunction with those discrete installation packages. In such an approach, a given application installation package may be configured to install (implement) a corresponding user application on a computing device or multiple computing devices (which may be implemented as VMs or physical machines) running a specific operating system (OS), or set of respective OSs (e.g., OS type and version). In this situation, the user application may not be limited to running on a specific VM technology, or a specific physical machine. In such an approach, the given application installation package may be implemented (installed), in a hybrid-cloud infrastructure, on any computing device or computing devices (virtual or physical) on which the specific OS or respective OSs are implemented. Such an approach thus avoids the drawbacks of standardizing cloud-based resources on a single cloud service technology, and the drawbacks of "siloing" the given application to implementation in on-premise computing resources or to implementation in a specific type of cloud-based computing resources.

Such computing devices (machines) may be provisioned using respective OS (machine image) installation packages. For instance, a given OS (machine image) installation package may include one or more executable files that, when executed, are configured to provision a computing device (virtual or physical) with a specific OS and configuration (machine image). For instance, as one example, a given OS (machine image) installation package may provision a virtual Web server running Linux 5 as a vApp in a public Terremark vCloud. Of course, a number or other possible arrangements are possible. Performing such provisioning may include running multiple installation files, such as an Apache installation file and a Linux 5 installation file, for example.

Also, because the given application, in such approaches, may not be dependent on the specific platform type (e.g., on-premise resources, Amazon EC2 instances, Terremark vApps, etc.), as long as that platform implements the given OS, an additional virtualization layer would not be required, thus avoiding the performance impact associated with such approaches. Further, because the given application may not be dependent on the specific technology used to implement a given computing system OS (machine) image, such approaches also allow for ease of work movement, flexing and cloud-bursting between platforms of a hybrid-cloud infrastructure that is implemented, in accordance with approaches described herein, using different technologies (e.g., on-premise resources, Amazon EC2 instances, Terremark vApps, etc.).

In this disclosure, various techniques for implementing hybrid-cloud infrastructures are described. It will be appreciated that the techniques, as described herein, are given by way of example and for purposes of illustration, and other approaches and/or arrangements are possible. For instance, depending on the particular implementation, each of the elements of the approaches described herein may be arranged or performed in other fashions, combined with other elements, or may be eliminated. In other implementations, some of the elements described herein may be implemented as multiple elements or multiple operations. In still other instances, additional elements and/or method operations may be added. As an example, for the approaches described below, information that is included in the network blueprint 400 may, in other implementations, be included in an application blueprint (e.g., application blueprint 300) or, alternatively, may be included in a request to provision (install) a user application (such as those described with respect to FIGS. 2A and 2B), thus allowing for flexibility in how a given hybrid-cloud infrastructure is defined and provisioned. As another example, a provisioner (such as provisioner 110) may be implemented as multiple entities, where a first entity provisions network resources, a second entity provisions OS images (machines) and a third entity installs applications in the machines corresponding with the provisioned OS images.

Referring to FIG. 1, the system 100 includes a network and application manager 102 that may be configured to implement (e.g., using the techniques described herein) hybrid-cloud infrastructures, such as by using on-premise computing resources 138, private cloud computing resources 144, and public cloud computing resources 146. As shown in FIG. 1, the on-premise computing resources 138 may include physical computing resources 140 and private (on-premise) cloud (virtual) computing resources 142. The particular arrangement of the computing resources 138, 144 and 146 is given by way of example and for purposes of illustration, and other arrangements are possible. For instance, in certain embodiments, the public cloud computing resources 146 may be implemented as multiple public cloud computing resources using different technologies (e.g., Amazon Web Services, Terremark vClouds, Xen clusters, etc.). In similar fashion, the private cloud computing resources 142 and 144 may also be implemented using different cloud-based technologies at different physical locations.

Using the techniques described herein, the network and application manager 102 may be configured to provide computing services (as a unified set of computing services) to a set of customers using a hybrid-cloud infrastructure without exposing the complexities of the hybrid-cloud to the customers, without limiting cloud-based resources to a single technology, and without adding additional layers of virtualization beyond hypervisors that are associated with the cloud-based resources 142, 144 and 146 of the system 100. In such approaches, users may request use of a computing resource (e.g., a user application or specific machine) and use of that application (or machine) may be provided to the user without the user being aware of the platform or platforms (e.g., of the computing resources 138, 144 and 146) that are used to implement the requested application (or machine).

As shown in FIG. 1, the network and application manager 102 includes an administrator 104, a provisioner 110, an installation package library 112, an application blueprint library 120 and a network blueprint library 126. As indicated above, the particular arrangement of the elements of the network and application manager 102 are given by way of example and, of course, other arrangements are possible. In one implementation, the network and application manager 102 may be implemented using one or more physical computing devices, such as physical server computing devices that include one or more processors, which, by executing machine readable instructions stored on a non-transitory medium, are configured to implement the elements of the network and application manager 102. In other instances, the network and application manager 102 may be implemented using a server that is implemented as a VM.

For instance, machine readable instructions included in the network application manager 102 may cause the network and application manager 102 to implement the installation package library 112, where the installation package library 112 may be implemented as a database, or as multiple databases and a catalog. For instance, as shown in FIG. 1, the installation package library 112 may include application packages 116 that are stored in a first database table, OS (machine image) packages 118 that are stored in a second database table and a catalog 114 that is used to index the application packages 116 and the OS (machine image) packages 118. In other approaches, separate catalogs and/or libraries could be used for the application packages 116 and the OS (machine image) packages 118. In an example embodiment, each of the application packages 116 and OS (machine image) packages 118 may each include a respective plurality of installation (e.g., executable) files that may be used, alone or in combination with other installation files, to provision computing device resources with specific machine images (e.g., a web server running Linux 5 or a Windows database server running MySQL) and/or to install user applications (e.g., on provisioned machines) that are requested by a user.

The network and application manager 102 may also include instructions that, when executed by one or more processors, cause the network and application manager 102 to implement the application blueprint library 120, where the application blueprint library 120 may be implemented as a database and a catalog. For example, as shown in FIG. 1, the application blueprint library 120 may include application blueprints 124 in a database table and a catalog 122 that is used to index the application blueprints 124.

As indicated in FIG. 1, the application blueprints 124 may be implemented using metadata descriptions. The network and application manager 102 may be configured to use those metadata descriptions (application metadata) to install and configure corresponding user applications. In an example implementation, the application blueprints 124 may be provided to the network and application manager 102 in a graphical form (e.g., via a GUI of the network and application manager 102), such as in the form shown in FIG. 3, which is discussed in further detail below. The blueprint administrator 108 may be configured to translate such graphical application blueprints to appropriate metadata. In example implementations, the user may request access to a user application (e.g., using a request that corresponds with FIG. 2A or 2B, which are discussed below). That request may then be matched, by the provisioner 110 of the network and application manager 102, with a corresponding application blueprint in the application blueprints 124 by, for instance, using the catalog 122. The application blueprint (metadata), once identified, may be used as a template to install the application using a corresponding application package 116.

The network and application manager 102 may further include instructions that, when executed by one or more processors, cause the network and application manager 102 to implement the network blueprint library 126, where the network blueprint library 126, in like fashion as the installation package library 112 and the application blueprint library 120, may be implemented as a database and a catalog. For example, as shown in FIG. 1, the network blueprint library 126 may include network blueprints 130 and a catalog 128 that is used to index the network blueprints 130.

As indicated in FIG. 1, the network blueprints 130 may include metadata descriptions (network metadata), which the network and application manager 102 is configured to use to provision and configure network topologies for hybrid-cloud infrastructures, such as in the fashions described herein. In an example implementation, the network blueprints 130 may be provided to the network and application manager 102 in a graphical form (e.g., via a GUI of the network and application manager 102), such as in the form shown in FIG. 4, which is discussed in further detail below. The blueprint administrator 108 may be configured to translate such graphical network blueprints to appropriate metadata. When a user requests access to a user application, the provisioner 110 may be configured to identify one or more computing resources (e.g., in a corresponding application blueprint) and then identify a network blueprint 130 that includes the identified computing resources. The provisioner 110 may be further configured to provision a hybrid-cloud network in accordance with the identified network blueprint 130 and also provision the identified one or more computing resources using corresponding, respective OS (machine image) package(s). Examples of such approaches are illustrated in further detail below with respect to FIGS. 2A, 2B, 3 and 4, as well as with respect to the methods of FIGS. 5A, 5B, 6 and 7.

In the system 100, the administrator 104 may be configured to receive application packages and application blueprints 132, and OS (machine image) packages and network blueprints 134. For instance, the installation package administrator 106 of the administrator 104 may be configured to store and catalog the received application packages and the received OS (machine image) packages in the installation package library 112, such as in the manners discussed herein. Further, the blueprint administrator 108 of the administrator 104 may be configured to store and catalog the received application blueprints and the received network blueprints in, respectively, the application blueprint library 120 and the network blueprint library 126, such as using the approaches described herein. Examples of such an approach are illustrated in further detail below with respect to FIGS. 6 and 7.

Also in the system 100, the provisioner 110 of the network and application manager 102 may be configured to receive application requests 136. In response to a given application request 136, the provisioner 110 may be configured to identify an application blueprint in the application blueprint library 120 that corresponds with the given application request 136. Further, in response to the given application request 136, the provisioner 110 may be configured to identify one or more computing resources corresponding with the given application request 136. The provisioner 110 may also be configured to, in response to the given application 136 request, identify a network blueprint in the network blueprint library 126 that corresponds with the given application request 136, and or the identified application blueprint.

The provisioner 110 may be still further configured to provision a computing network (e.g., a hybrid-cloud infrastructure) in accordance with network metadata that is included in the identified application blueprint and also provision, in the provision computing network, the identified one or more computing resources using corresponding OS (machine image) packages included in the installation package library 112. The provisioner 110 may be yet still further configured to install the user application in accordance with the identified application blueprint, e.g., using an associated application installation package included in the installation package library 112.

FIGS. 2A, 2B, 3 and 4 are diagrams, in graphical form, that illustrate application requests 200 and 250, an application blueprint 300 and a network blueprint 400 that may be used when implementing a hybrid-cloud infrastructure according to an example implementation. The application requests 200 and 250, the application blueprint 300 and the network blueprint 400 may be used to implement hybrid-cloud infrastructures in the system 100 shown in FIG. 1. It will be appreciated that the diagrams shown in FIGS. 2A, 2B, 3 and 4 are given by way of example and for purposes of illustration. Depending on the particular implementation, such application requests, application blueprints and network blueprints may take other forms and may include a number of other application requests, application blueprints and network blueprints. In one implementation, an application request may be made by a user selecting an installation icon, where metadata associated with that icon corresponds, respectively, with the application request 200, the application request 250, or another application request (not shown).

In other implementations, the application requests 200 and 250, the application blueprint 300 and the network blueprint 400 may be provided, e.g., to the network and application manager 102, using a GUI of the network application manager 102 in their graphical form, such as shown in FIGS. 2A, 2B, 3 and 4. In an example implementation, such as in the system 100 shown in FIG. 1, the provisioner 110 and/or the administrator 104 may translate such application requests, application blueprints and network blueprints to appropriate metadata, where the form of the metadata depends on the particular implementation.

Further, the particular arrangement of the information shown in FIGS. 2A, 2B, 3 and 4 is also given by way of example and for purposes of illustration. In other implementations, this information may be arranged in other fashions, other information may be included and/or certain information may be omitted. For example, information that is shown in the network blueprint 400 may be, alternatively, included in the application blueprint 300 or in the application request 200.

Figure 2A:
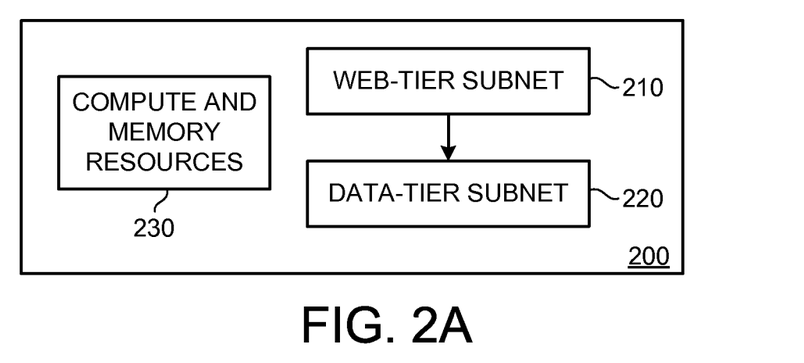
FIG. 2A is a diagram illustrating an application request for a two-tier application according to an example implementation.
Figure 2B:
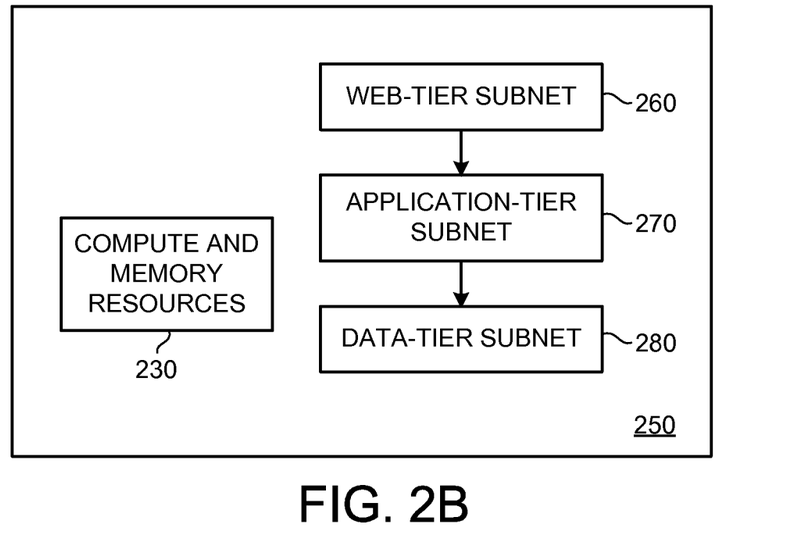
FIG. 2B is a diagram illustrating an application request for a three-tier application according to an example implementation.
Figure 3:
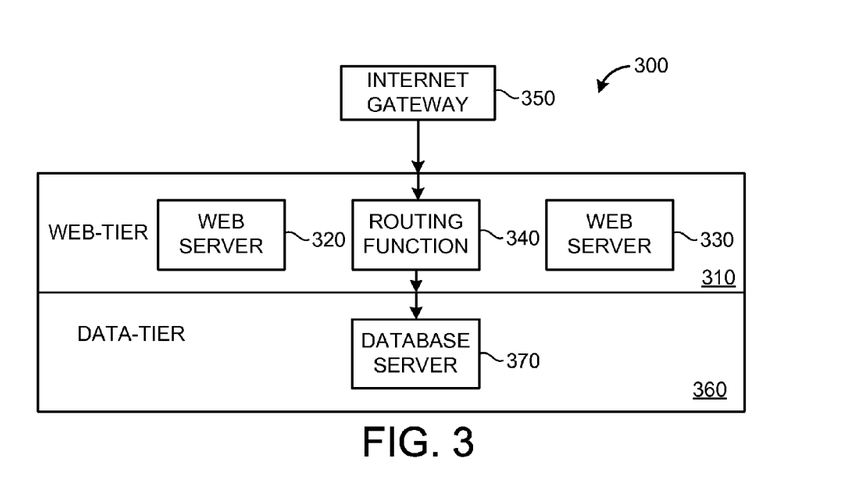
FIG. 3 is a diagram illustrating an application blueprint for the two-tier application of FIG. 2A according to an example implementation.
Figure 4:
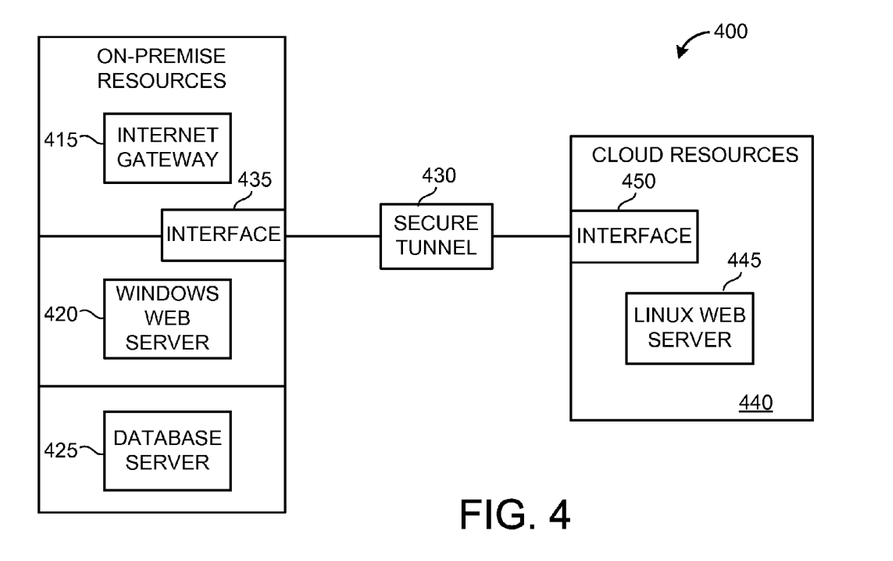
FIG. 4 is a diagram illustrating a network blueprint for a hybrid-computing network that may be used to implement the two-tier application of FIGS. 2A and 3 according to an example implementation.

For instance, the OSs specified for the web servers 420 and 440 in the network blueprint 400 of FIG. 4 may be specified, alternatively, in the application blueprint 300 for, respectively, Web servers 320 and 330 shown in FIG. 3. As yet another alternative, the OSs specified for the Web servers 420 and 440 may be specified in the application request 200 shown in FIG. 2A. In still other implementations, other information in the application requests 200 and 250, information in the application blueprint 300 and information in the network blueprint 400 may be specified in other locations than those shown in FIGS. 2A, 2B, 3 and 4, as is appropriate for a particular implementation.

FIG. 2A is a diagram illustrating an application request 200 for a two-tier Web application according to an example implementation, which is shown in graphical form. As indicated above, the application request 200 is shown by way of example and for purposes of illustration. In certain implementations, the application request 200 may take other forms, or may be implemented in other fashions, such as by a user selecting an application installation icon, for example.

As shown in FIG. 2A, the application request 200 corresponds to a request for a two-tier application that includes a Web-tier 210 and a data-tier 230 (e.g., where the request 200 specifies the number of tiers and the types of tiers). An example of such an application may be an instance of MediaWiki that is implemented in such a manner. In such an approach, the application logic may be implemented using Web enabled languages such as HTML and Java, for example. Accordingly, the application logic may, in such an approach, operate in the Web-tier 210 of such an application.

The application request 200 also includes compute and memory resource specifications 230. The compute and memory resource specifications 230 may include, for example, a number of central processor units, an amount of random access memory and an amount of persistent memory storage for implementing the two-tier application corresponding with the application request 200. The compute and memory resource specifications 230 may be used, for example, by the provisioner 110 when provisioning a hybrid-cloud infrastructure in which the application corresponding with the application request 200 is to be implemented.

While not shown in FIG. 2A, the request 200 may also include an indication of the file (or files) that are included (or make up) an installation package for an application corresponding with the application request 200. These file indications may include interchangeable options for one or more of the files. For instance, using the MediaWiki example, the application request 200 may indicate that the installation package includes one or more versions of an installation file (e.g., based on operating system) for implementing (installing) the Web-tier 210 functionality and an installation file for implementing (installing) the data-tier 220 functionality. In certain embodiments, the application request 200 may also include network topology criteria, such as network topology information that is shown in the examples of FIGS. 3 and 4. In such approaches, that network topology information may then not be included in the application blueprint 300 or the network blueprint 400, as appropriate.

FIG. 2B is a diagram illustrating an application request 250 for a three-tier application according to an example implementation, which is shown in graphical form. As indicated above, the application request 250 is shown by way of example and for purposes of illustration. In certain implementations, in like fashion as the application request 200, the application request 250 may take other forms, or may be implemented in other fashions, such as by a user selecting an application installation icon, for example.

As shown in FIG. 2B, the application request 250 corresponds to a request for a three-tier application that includes a Web-tier 260, an application-tier 270 and a data-tier 280 (e.g., where the request 250 specifies the number of tiers and the types of tiers). An example of such an application may be an instance of an electronic banking application that is implemented in such a manner. In such an approach, the application logic of the application may be implemented using a combination of Web enabled languages and non-Web enabled languages, for example. Accordingly, the application logic may, in such an approach, operate in both the Web-tier 260 and the application-tier 270 of such an application, while the data logic operates in the data-tier 280. In other implementations, an application request may specify other numbers of tiers).

The application request 250 also includes compute and memory resource specifications 290. In like fashion as the compute and memory resource specifications 230 of the application request 200, the compute and memory resources 290 may include, for example, a number of central processor units, an amount of random access memory and an amount of persistent memory storage for implementing the three-tier application corresponding with the application request 250. The compute and memory resource specifications 290 may be used, for example, by the provisioner 110 when provisioning a hybrid-cloud infrastructure in which the application corresponding with the application request 250 is to be implemented.

While not shown in FIG. 2B, the request 200 may also include an indication of the file (or files) that are included (or make up) an installation package for a three-tier application corresponding with the application request 250. These file indications may include interchangeable options for one or more of the files. For instance, the application request 250 may indicate that the installation package includes one or more versions of an installation file for implementing (installing) the Web-tier 260 functionality, one or more versions of an installation file for implementing (installing) the application-tier 270 functionality and one or more versions of an installation file for implementing (installing) the data-tier 280 functionality, where different versions for a given tier may install substantially the same functionality on machines (computing devices, virtual or physical) that run using different operating systems, where those machines may be provisioned using the approaches described herein). In certain embodiments, the application request 250 may also include network topology criteria, such as network topology information that is shown the examples of FIGS. 3 and 4. In such approaches, that network topology information may then not be included in the application blueprint 300 or the network blueprint 400, as appropriate.

Depending on the particular implementation, the application request 250 may include one or more of the following: an indication of respective operating systems on which the tiers application can be implemented; an indication of a respective computing resource platform types on which the tiers of the application can be implemented (such as physical resources and/or virtual resources); and an indication of respective computing resource locations for implementing the tiers of the application (e.g., on-premise resources, private cloud resources and/or public cloud resources).

FIG. 3 is a diagram illustrating an application blueprint 300 for the two-tier application of FIG. 2A according to an example implementation. As indicated above, the application blueprint 300 is shown by way of example and for purposes of illustration. In certain implementations, the application blueprint 300 may take other forms, or may be implemented in other fashions. For example, in the system 100, the graphical form of the application blueprint 300 shown in FIG. 3 may be entered using a GUI of the network and application manager 102. In such an approach, the blueprint administrator 108 of the administrator 104 may translate the application blueprint 300 to appropriate application metadata for the particular implementation. The application metadata may then be used by the provisioner 110 when implementing (installing) the application associated with the application request 200 and the application blueprint 300.

It will be appreciated that the application blueprint 300 shown in FIG. 3 is an example that is provided for purposes of illustration for this disclosure. In example implementation, such as the system 100, the application blueprint 300 may be included in the application blueprints 124 of the application blueprint library 120 along with a number of other application blueprints. In such an approach, each of the other application blueprints may correspond, respectively, with another application, or may correspond with the same application as the application blueprint 300 but define a different configuration for that application.

As noted above, the application blueprint 300 may be used, e.g., in the system 100, to implement (install) the two-tier application corresponding with the application request 200 of FIG. 2A. For instance, in the system 100, the application request 200 may be received by the provisioner 110 and, in response to receiving the application request 200, the provisioner 110 may identify the application blueprint 300 in the application blueprint library 120 as an application blueprint that corresponds with the two-tier application corresponding with the application request 200.

As shown in FIG. 3, the application blueprint includes a Web-tier 310, including a Web server 320, a Web server 330 and a routing function 340. In such an approach, the routing function 340 may facilitate communication between a data network, such as the Internet via an Internet gateway 350, and a data-tier 360. As shown in FIG. 3, the data-tier 360 includes a database server 370 that may be used to implement the data-tier 360.

In an example implementation, the application blueprint 300 may indicate, for one or more of the computing resources (machines) included in the application blueprint 300, an indication of a respective OS, an indication of a platform type (e.g., physical resource or cloud-based resource), and/or an indication of a location of the computing resource (e.g., on-premise resource, private cloud resource or public cloud resource). In other embodiments, the application blueprint 300 may include an indication of a number of tiers of an application that is associated with the application blueprint 300, rather than that information being included in the application request 200, for example.

FIG. 4 is a diagram illustrating a network blueprint 400 for a hybrid-computing network (hybrid-cloud infrastructure) that may be used to implement the two-tier application of FIGS. 2A and 3 according to an example implementation. As indicated above, the network blueprint 400 is shown by way of example and for purposes of illustration. In certain implementations, the network blueprint 400 may take other forms, or may be implemented in other fashions. For example, in the system 100, the graphical form of the network blueprint 400 shown in FIG. 4 may be entered using a GUI of the network and application manager 102. In such an approach, the blueprint administrator 108 of the administrator 104 may translate the network blueprint 400 to appropriate network metadata for the particular implementation. That network metadata may then be used by the provisioner 110 when provisioning (implementing) a hybrid-cloud infrastructure corresponding with the application request 200, the application blueprint 300 and the network blueprint 400.

It will be appreciated that the network blueprint 400 shown in FIG. 4 is an example given for purposes of illustration in this disclosure. In an example embodiment, such as in the system 100, the network blueprint 400 may be included in the network blueprints 130 of the network blueprint library 126 along with a number of other network blueprints, where each of the other application blueprints corresponds, respectively, with other network configurations that may or may not be used to implement the user application corresponding with the application request 200 and the application blueprint 300. For instance, such other network configurations may define hybrid-cloud infrastructures that may be used when implementing other user applications than the user application associated with the application request 200 and the application blueprint 300.

As noted above, the network blueprint 400 may be used, e.g., in the system 100, to provision a hybrid-cloud infrastructure that may be used to implement (install) the two-tier application corresponding with the application request 200 of FIG. 2A. For instance, in the system 100, the application request 200 may be received by the provisioner 110 and, in response to receiving the application request 200, the provisioner 110 may identify the application blueprint 300 in the application blueprint library 120 and the network blueprint 400 in the network blueprint library 126. The provisioner 110 may then provision a hybrid-cloud infrastructure in accordance with the network blueprint 400, provision computing resources (machines) in accordance with computing devices defined in the application blueprint 300 and/or the network blueprint 400, and implement (install) the user application corresponding with the application request 200 in the provisioned machines of the provisioned hybrid-cloud infrastructure.

The network blueprint 400 shown in FIG. 4 includes on-premise resources 410, a secure tunnel 430, and cloud-based resources 440. The on-premise resources 410 of the network blueprint 400 may include an Internet gateway 415, a Windows-based Web server 420 and a database server 425. The on-premise resources may also include a tunnel interface 435 that allows the on-premise resources 410 to communicate securely, via a secure tunnel 430, with the cloud-based resources 440. In like fashion as the on-premise resources 410, the cloud-based resources 440 also may include a tunnel interface 450 that is configured to facilitate such secure communication with the on-premise resources 410. As further illustrated in FIG. 4, the cloud-based resources 440 include a Linux web server 445. While not shown in FIG. 4, the network blueprint 400 may also include other implementation details, such as details defining firewall configurations, port configurations, and further configuration information for each of the computing resources (machines) and/or network elements, such as OS or other implementation details. For instance, these details may include a number of other types of appropriate network configuration information including implementation (provisioning) details for the secure tunnel 430.

Using the techniques described herein, the hybrid-cloud infrastructure illustrated by the network blueprint 400 may be used to implement the user application corresponding with the application request 200 of FIG. 2A and the application blueprint 300 of FIG. 3. For instance the Internet gateway 415 may be used to implement the Internet gateway 350 of the application blueprint 300, the windows Web server 420 may be used to implement the Web server 320, the Linux Web server 445 may be used to implement the Web server 330 and the database server 425 may be used to implement the database server 370.

In an example implementation, as briefly discussed above, the network blueprint 400 may indicate, for one or more of the computing resources (machines) and/or network elements included in the network blueprint 400, an indication of a respective OS, an indication of a platform type (e.g., physical resource or cloud-based resource (including platform type)), and/or an indication of a location of the computing resource or network element (e.g., on-premise resource, private cloud resource or public cloud resource).

Figure 5A:
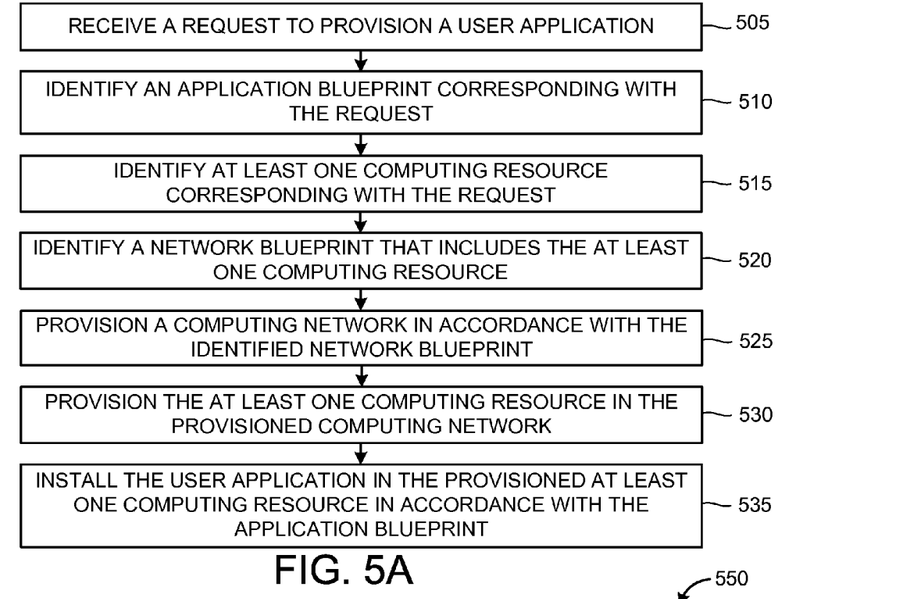
FIG. 5A is a flowchart illustrating a method for provisioning (implementing) a user application in a hybrid-computing network according to an example implementation.
Figure 5B:
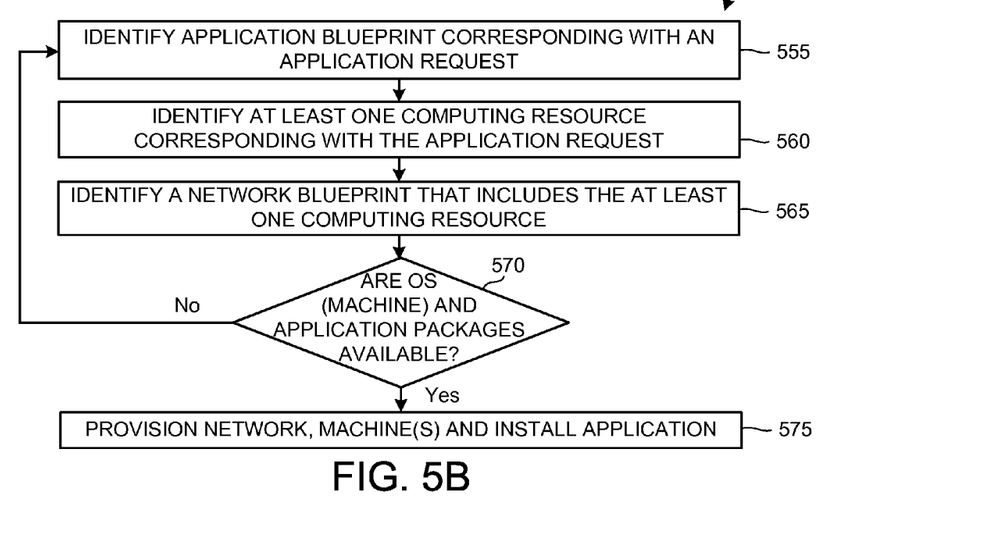
FIG. 5B is a flowchart illustrating a method for identifying an application blueprint and a corresponding network blueprint according to an example implementation.
Figure 6:
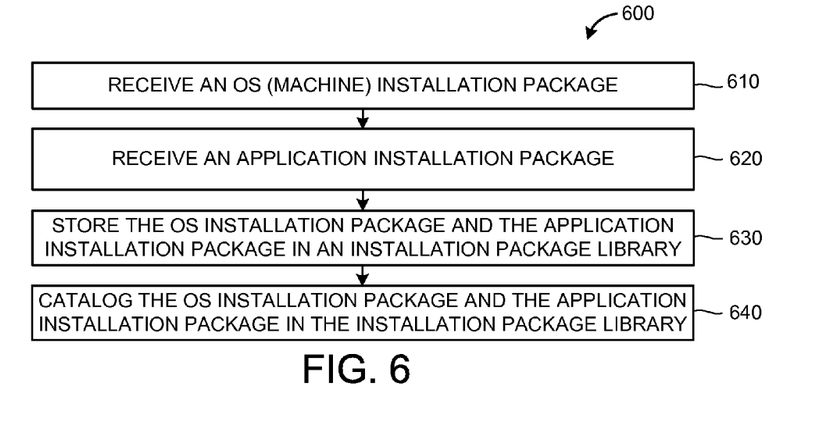
FIG. 6 is a flowchart illustrating a method for administrating an installation package library according to an example implementation.
Figure 7:
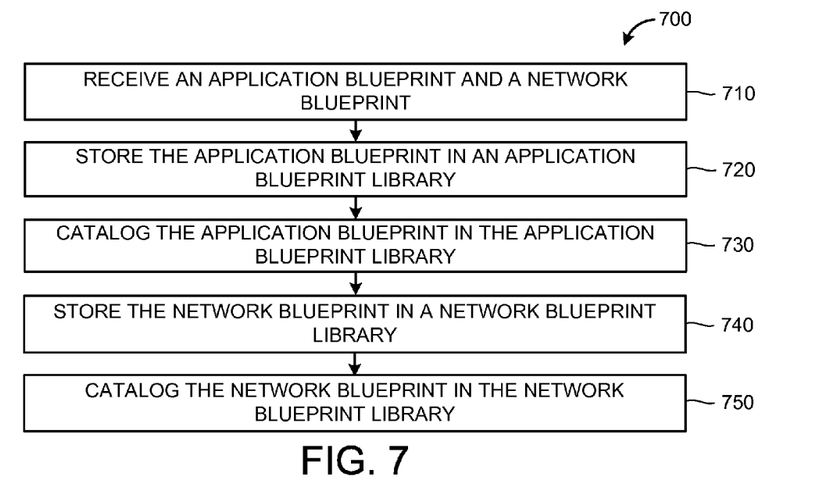
FIG. 7 is a flowchart illustrating a method for administrating an application blueprint library and a network blueprint library according to an example implementation.

FIG. 5A is a flowchart illustrating a method 500 for provisioning (implementing) a user application in a hybrid-computing network according to an example implementation. The method 500 may be implemented using the approaches discussed above with respect to FIGS. 1-4. Accordingly, for purposes of illustration, the method 500 will be described with further reference to FIGS. 1-4, as appropriate. Further, the method 500 may also be implemented in conjunction with the methods illustrated in FIGS. 5B, 6 and 7, which are each described in order below. In FIGS. 5B, 6 and 7, some operations of one method may be duplicated in other methods, or a similar operation of one method may be included in another method for clarity of illustration. For instance, operations for identifying blueprints are repeated in FIGS. 5A and 5B. It will be appreciated that the particular operations performed by a given implementation may vary. Further, the method 500 (as well as each of the methods illustrated in FIGS. 5B, 6 and 7) may be implemented as computer-implemented methods by one or more-processors executing machine-readable instructions that are stored in a non-transitory, computer-readable medium.

In FIG. 5A, the method 500 includes, at block 505, receiving, e.g., at the network and application manager 102, a request to provision a user application. As discussed above, the provisioner 110 of the network and application manager 102 may receive a request 136 from a user to install (provision) a specific user application. For instance, the user may provide the request 136 in a form such as those shown in FIGS. 2A and 2B by using a GUI that is implemented by the network and application manager 102. In other instances, a user may submit a request 136 in another form, such as by selecting an application installation icon or submitting a metadata request, as some examples. At block 510, the request 136 may be matched with an application blueprint (e.g., from the application blueprint library 120) that, depending on the particular implementation, may take the form of metadata that corresponds with (describes or translates to) one of the application blueprints 200, 250 or 300.

At block 515, the method 500 includes identifying at least one computing resource corresponding with the request of block 505. Identifying the at least one computing resource at block 515 may be performed based on information included in the request received at block 505 or, alternatively, may be performed based on the application blueprint identified at block 510. For instance, using the application blueprint 300 of FIG. 3 as an example, identifying the at least one computing resource at block 515 may include identifying the web server 320 (in a web-tier), the web server 330 (in the web-tier) and the database server 370 (in a data-tier).

At block 520, the method 500 includes identifying a network blueprint that includes the at least one computing resource identified at block 515. For instance, again using the application blueprint 300 as an example, identifying the network blueprint at block 520 may include, in one implementation, the provisioner 110 identifying the network blueprint 400 in the network blueprint library 126. At block 525, the method 500 includes provisioning a computing network in accordance with the identified network blueprint and, at block 530, provisioning the at least one computing resource in the provisioned computing network. At block 535, the method 500 includes installing the user application in the provisioned at least one computing resource, such as in accordance with the application blueprint. For instance, at block 535, the user application may be installed using a corresponding application installation package (or packages) from the installation package library 112.

FIG. 5B is a flowchart illustrating a method 550 for identifying an application blueprint and a corresponding network blueprint according to an example implementation. As with the method 500, the method 550 may be implemented using the approaches discussed above with respect to FIGS. 1-4 and in conjunction with the method of, at least, FIG. 5A. Accordingly, for purposes of illustration, the method 500 will also be described with further reference to FIGS. 1-5A, as appropriate.

The method 550, in one implementation, may be implemented in conjunction with the method 500 (e.g., as the operations 515-525 of the method illustrated in FIG. 5B), where an application blueprint and a network blueprint are identified iteratively using the method 550. In other implementations, only an application blueprint or a network blueprint may be identified iteratively using similar techniques to those illustrated in FIG. 5B.

The method 550, at block 555, includes identifying an application blueprint that corresponds with an application request. For instance, an application blueprint may be identified in similar fashion and using the approaches described above with respect to FIGS. 1-5A, for example. The method 550 further includes, at block 560, identifying at least one computing resource corresponding with the application request and, at block 565, identifying a network blueprint that includes the at least one computing resource identified at block 560. At block 570, the method 550 includes determining whether OS (machine) installation package(s) corresponding with the at least one computing resource identified at block 560 and an application package or groups of packages corresponding with the identified application blueprint (e.g., the requested application) are available, such as in the installation package library 112 of the system 100 shown in FIG. 1.

If it is determined, at block 570, that the packages (OS (machine) installation and application installation) are available, the method 550 includes, at block 575, provisioning a network (in accordance with the network blueprint identified at block 565), provisioning the machines (computing resources) identified at block 560 in the provisioned network, and installing the requested user application in the provisioned machines in accordance with the application blueprint identified at block 555 and the corresponding application installation package(s). In the approaches described herein, provisioning the network and/or the machines at block 575 (as well as at block 525 and 530 of the method 500) may include identifying a previously provisioned network and/or machines that correspond with a given application request, a corresponding application blueprint and/or a corresponding network blueprint, as may be identified using the methods 500 and 555. The requested user application, in such instances, may be installed in the previously provisioned network and/or on the previously provisioned machines (e.g., virtual or physical).

If it is determined, at block 575, that the OS (machine) installation package(s) and/or the application installation package(s) are not available, the method 575 may return to block 555 and the process of identifying an application blueprint (block 555), identifying computing resources (block 560) and/or identifying a network blueprint (block 565) may be repeated. Depending on the particular situation, some or all of the operations of the block 555-565 may be repeated, where the operations that are repeated may depend on the results of the comparison performed at block 570. Once the appropriate operations of blocks 555-565 have been repeated, the comparison at block 570 is performed again and the method 550 proceeds in like fashion as discussed above based on that comparison.

FIG. 6 is a flowchart illustrating a method 600 for administrating an installation package library (e.g., installation package library 112) according to an example implementation. As with the methods 500 and 550, the method 600 may be implemented using the approaches discussed above with respect to FIGS. 1-4 and in conjunction with the method of, at least, FIG. 5A. Accordingly, for purposes of illustration, the method 600 will also be described with further reference to FIGS. 1-5A, as appropriate.

The method 600 may be used to add installation packages (e.g., application packages 116 and OS (machine image) installation packages 118) to the installation package library 112 of the network and application manager 102, where those added installation packages are then used by the methods 500 and 550 to implement a hybrid-cloud infrastructure, such as using the techniques described herein.

A block 610, the method 600 includes receiving an OS (machine) installation package. At block 620, the method 600 includes receiving an application installation package. In an example implementation, such as in the system 100, the OS (machine) package may be received by the installation package administrator 106 (e.g., of the administrator 104) from an OS and platform administrator. For instance, the installation package administrator 106 may receive the OS (machine image) package, and then add the received package to the OS (machine image) packages 118 in the installation package library 112. The installation package administrator 106 may also be configured to receive the application installation package of block 620, such as from an application administrator. In some instances, the OS and platform administrator and the application administrator may be the same entity/person. For instance, in some implementations, the application administrator and the OS and platform administrator functions may include an automated process (e.g., that is included in the administrator 104). As described herein, a given installation package may include a respective plurality of installation packages.

The method 600 further includes, at block 630, storing the OS (machine image) installation package and the installation package in an installation package library and, at block 640, cataloging the OS (machine image) installation package and the application installation package in a catalog of the installation package library. For example, in the system 100, the package administrator 106 of the installation administrator 104 may be configured to perform database operations to store (at block 630) and catalog (at block 640) the OS (machine image) installation package and the application installation package in the installation package library 112, such as in the manners described herein. The method 600 may be repeated to add additional installation packages to the installation package library 112. Further, similar methods may be used to only add an application installation package or to only add an OS (machine image) installation package.

FIG. 7 is a flowchart illustrating a method 700 for administrating an application blueprint library and a network blueprint library. As with the methods 500, 550 and 600, the method 700 may be implemented using the approaches discussed above with respect to FIGS. 1-4 and in conjunction with the methods of, at least, FIGS. 5A and 6. Accordingly, for purposes of illustration, the method 700 will also be described with further reference to FIGS. 1-4, 5A and 6, as appropriate.

The method 700 may be used to add application blueprints to the application blueprint library 120 and network blueprints to the network blueprint library 126 of the network and application manager 102, where those added blueprints are then used by the methods 500 and 550 to implement a hybrid-cloud infrastructure, such as using the techniques described herein.

At block 710, the method 700 includes receiving an application blueprint and a network blueprint, such as the application blueprint 300 and the network blueprint 400 discussed above. In an example implementation, such as in the system 100, the network blueprint 400 may be received by the blueprint administrator 108 (e.g., of the administrator 104) from an OS and platform administrator. For instance, the blueprint administrator 108 may receive the network blueprint 400, and then (as is discussed below) add the network blueprint 400 to the network blueprints 130 in the network blueprint library 126. The blueprint administrator 108 may also be configured to receive the application blueprint 300, such as from an application administrator, and then (as is discussed below) add the application blueprint 300 to the application blueprints 124 in the application blueprint library 120. As was discussed above with respect to FIG. 6, in some instances, the OS and platform administrator and the application administrator may be the same entity/person. For example, in some implementations, the application administrator and the OS and platform administrator functions may include an automated process (e.g., that is included in the administrator 104).

The method 700 further includes, at block 720, storing the application blueprint in an application blueprint library and, at block 730, cataloging the application blueprint in a catalog of the application blueprint library. For example, in the system 100, the administrator 104 may be configured to perform a database operation to store (at block 720) and catalog (at block 730) the application blueprint in the application blueprint library 120, such as in the manners described herein.

The method 700 still further includes, at block 740, storing the network blueprint in a network blueprint library and, at block 750, cataloging the network blueprint in a catalog of the network blueprint library. For example, in the system 100, the blueprint administrator 108 of the administrator 104 may be configured to perform a database operation to store (at block 740) and catalog (at block 750) the network blueprint in the network blueprint library 126, such as in the manners described herein. In like fashion as discussed above with respect to the method 600, some or all of the operations of the method 700 may be repeated to add additional application blueprints to the application blueprint library 120 and/or to add additional network blueprints to the network blueprint library 126. Also, similar methods may be used to only add an application installation package or to only add an OS (machine image) installation package.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method including executing, by at least one processor of a computing device, instructions recorded on a non-transitory computer-readable storage medium, the method comprising:
 receiving, at the computing device, a request to provision a user application, the request specifying at least one tier for implementing a specific functionality of the user application;
 identifying an application blueprint corresponding with the request, the application blueprint specifying a configuration of the at least one tier;
 identifying at least one computing resource corresponding with the request;
 identifying a network blueprint that includes the at least one computing resource, the network blueprint specifying at least one component included in the at least one computing resource for use in implementing the configuration of the at least one tier;
 provisioning a computing network in accordance with the identified network blueprint;
 provisioning the at least one computing resource in the provisioned computing network; and
 installing the user application in the provisioned at least one computing resource in accordance with the application blueprint.

2. The computer-implemented method of claim 1, wherein identifying the at least one computing resource and identifying the network blueprint are performed iteratively based on a library of computing resource images.

3. The computer-implemented method of claim 2, wherein iteratively identifying the at least one computing resource and the network blueprint is further based on a library of application installation packages.

4. The computer-implemented method of claim 3, wherein the library of computing resource images and the library of application installation packages are included in a unified installation package library.

5. The computer-implemented method of claim 1, wherein identifying the network blueprint includes identifying a hybrid network blueprint.

6. The computer-implemented method of claim 5, wherein the hybrid network blueprint defines a hybrid computing network including two or more of:
 an on-premise computing resource;
 a private-cloud computing resource; and
 a public-cloud computing resource.

7. The computer-implemented method of claim 6, wherein the hybrid computing network further includes a secure data communication tunnel operably coupling two computing resources of the hybrid computing network.

8. The computer-implemented method of claim 1, wherein the request to provision the user application includes at least one of:
 computing resource criteria; and
 network topology criteria.

9. The computer-implemented method of claim 8, wherein the computing resource criteria includes one or more of:
 an indication of an operating system;
 an indication of a computing resource platform type; and
 an indication of a computing resource location.

10. The computer-implemented method of claim 8, wherein the network topology criteria includes one or more of:
 an indication of a number of application tiers;
 an indication of a private-cloud computing resource;
 an indication of a public-cloud computing resource; and
 an indication of an on-premise computing resource.

11. The computer-implemented method of claim 1, wherein the application blueprint includes a respective definition of the at least one computing resource, the definition including one or more of:
 an indication of an operating system;
 an indication of a computing resource platform type; and
 an indication of a computing resource location.

12. The computer-implemented method of claim 1, wherein the application blueprint includes network topology criteria including one or more of:
 an indication of a number of application tiers;
 an indication of a private-cloud computing resource;
 an indication of a public-cloud computing resource; and
 an indication of an on-premise computing resource.

13. The computer-implemented method of claim 1, wherein the network blueprint includes network topology criteria including one or more of:
 an indication of a private-cloud computing resource;
 an indication of a public-cloud computing resource; and
 an indication of an on-premise computing resource.

14. The computer-implemented method of claim 1, wherein identifying at the least one computing resource corresponding with the request includes identifying two or more computing resources corresponding with the request.

15. A computer program product, the computer program product being tangibly embodied on a non-transitory computer-readable storage medium storing instructions that when executed cause a processor to perform a process, the instructions comprising instructions to:
 receive a request to provision a user application, the request specifying at least one tier for implementing a specific functionality of the user application;
 identify an application blueprint corresponding with the request, the application blueprint specifying a configuration of the at least one tier;
 identify at least one computing resource corresponding with the request;
 identify a network blueprint that includes the at least one computing resource, the network blueprint specifying at least one component included in the at least one computing resource for use in implementing the configuration of the at least one tier;
 provision a computing network in accordance with the identified network blueprint;
 provision the at least one computing resource in the computing resource network; and
 install the user application in the provisioned at least one computing resource in accordance with the application blueprint.

16. The computer program product of claim 15, wherein the instructions to identify the at least one computing resource and to identify the network blueprint include instructions to iteratively identify the at least one computing resource and the network blueprint based on an installation package library including:
- at least one machine installation package corresponding with the at least one computing resource; and
- at least one application installation package corresponding with the user application.

17. The computer program product of claim 15, wherein the instructions to provision the computing network include instructions to provision a hybrid computing network including two or more of:
- a private-cloud computing resource;
- a public-cloud computing resource; and
- an on-premise computing resource.

18. The computer program product of claim 15, wherein the instructions to identify the at least one computing resource corresponding with the request include instructions to identify two or more computing resources corresponding with the request.

19. A computing device including instructions recorded on a computer-readable medium and executable by at least one processor, the instructions, when executed by the at least one processor, cause the computing device to implement:
- an installation package library including:
  - a first installation package configured to provision a first computing resource having a first machine image;
  - a second installation package configured to provision a second computing resource having a second machine image; and
  - a third installation package configured to install a user application on the first computing resource and the second computing resource;
- an application blueprint library including an application blueprint corresponding with the user application, the application blueprint including application metadata defining configuration information for the user application;
- a network blueprint library including a network blueprint, the network blueprint including network metadata defining a computing network including the first computing resource and the second computing resource; and
- a provisioner configured to:
  - receive a request to provision the user application;
  - identify, in response to the request, the application blueprint;
  - identify, in response to the request, the network blueprint;
  - provision the computing network in accordance with the network metadata;
  - provision the first computing resource in accordance with the first installation package;
  - provision the second computing resource in accordance with the second installation package; and
  - install the user application in accordance with the third installation package and the application blueprint.

20. The computing device of claim 19, wherein the instructions, when executed by the at least one processor, cause the computing device to implement:
- an installation package library administrator configured to:
  - receive the first, second and third installation packages;
  - store the first, second and third installation packages in the installation package library; and
  - catalog the first, second and third installation packages in the installation package library.

21. The computing device of claim 19, wherein the instructions, when executed by the at least one processor, cause the computing device to implement:
- a blueprint library administrator configured to:
  - receive the application blueprint and the network blueprint;
  - store the application blueprint in the application blueprint library;
  - catalog the application blueprint in the application blueprint library;
  - store the network blueprint in the network blueprint library; and
  - catalog the network blueprint in the network blueprint library.

22. The computing device of claim 19, wherein at least one of the first, second and third installation packages includes a respective plurality of installation packages.

23. The computing device of claim 19, wherein at least one of the first and second computing resources includes a virtual computing resource.

24. The computer-implemented method of claim 1, wherein the at least one tier is a Web-tier or a data-tier, and wherein application logic included in the user application operates on the Web-tier and data logic included in the user application operates in the data-tier.

* * * * *

UNITED STATES PATENT AND TRADEMARK OFFICE
CERTIFICATE OF CORRECTION

| | | |
|---|---|---|
| PATENT NO. | : 9,122,552 B2 | Page 1 of 1 |
| APPLICATION NO. | : 13/538591 | |
| DATED | : September 1, 2015 | |
| INVENTOR(S) | : Jonathan Newcomb Swirsky Whitney et al. | |

It is certified that error appears in the above-identified patent and that said Letters Patent is hereby corrected as shown below:

On the Title page, in item (54), and in the Specification, in column 1, line 1, in "Title", delete "HYBRID CLOUD" and insert -- HYBRID-CLOUD --, therefor.

In the Claims

In column 20, line 40, in claim 14, delete "at the least" and insert -- the at least --, therefor.

Signed and Sealed this
Sixteenth Day of February, 2016

Michelle K. Lee
*Director of the United States Patent and Trademark Office*